United States Patent
Williams

[15] 3,654,775
[45] Apr. 11, 1972

[54] DISC TYPE FLEXIBLE SHAFT COUPLING

[72] Inventor: Charles H. Williams, Export, Pa.
[73] Assignee: Koppers Company, Inc.
[22] Filed: Mar. 16, 1970
[21] Appl. No.: 19,803

[52] U.S. Cl. .................................................. 64/13, 64/31
[51] Int. Cl. ........................................................ F16d 3/78
[58] Field of Search ................................... 64/13, 11, 31

[56] References Cited

UNITED STATES PATENTS

| | | | |
|---|---|---|---|
| 3,500,660 | 3/1970 | Anderson | 64/13 |
| 3,336,764 | 8/1967 | Chambers | 64/13 |
| 2,499,093 | 2/1950 | Fast | 64/13 |

*Primary Examiner*—Kenneth W. Sprague
*Attorney*—Oscar B. Brumback, Boyce C. Dent and Olin E. Williams

[57] ABSTRACT

A flexible shaft coupling of the laminated disc-pack type having multi-element mounting hubs enabling the disc-packs to be axially separated outboard of the hubs and yet be removable without moving the coupling-connected shafts. The coupling includes a hub for each shaft, a triangular adapter connected to each hub and its respective disc-pack, a sleeve axially connecting the disc-packs and arranged to cover both the disc-packs and adapters and preferably a shroud at each end of the sleeve to close the coupling.

16 Claims, 12 Drawing Figures

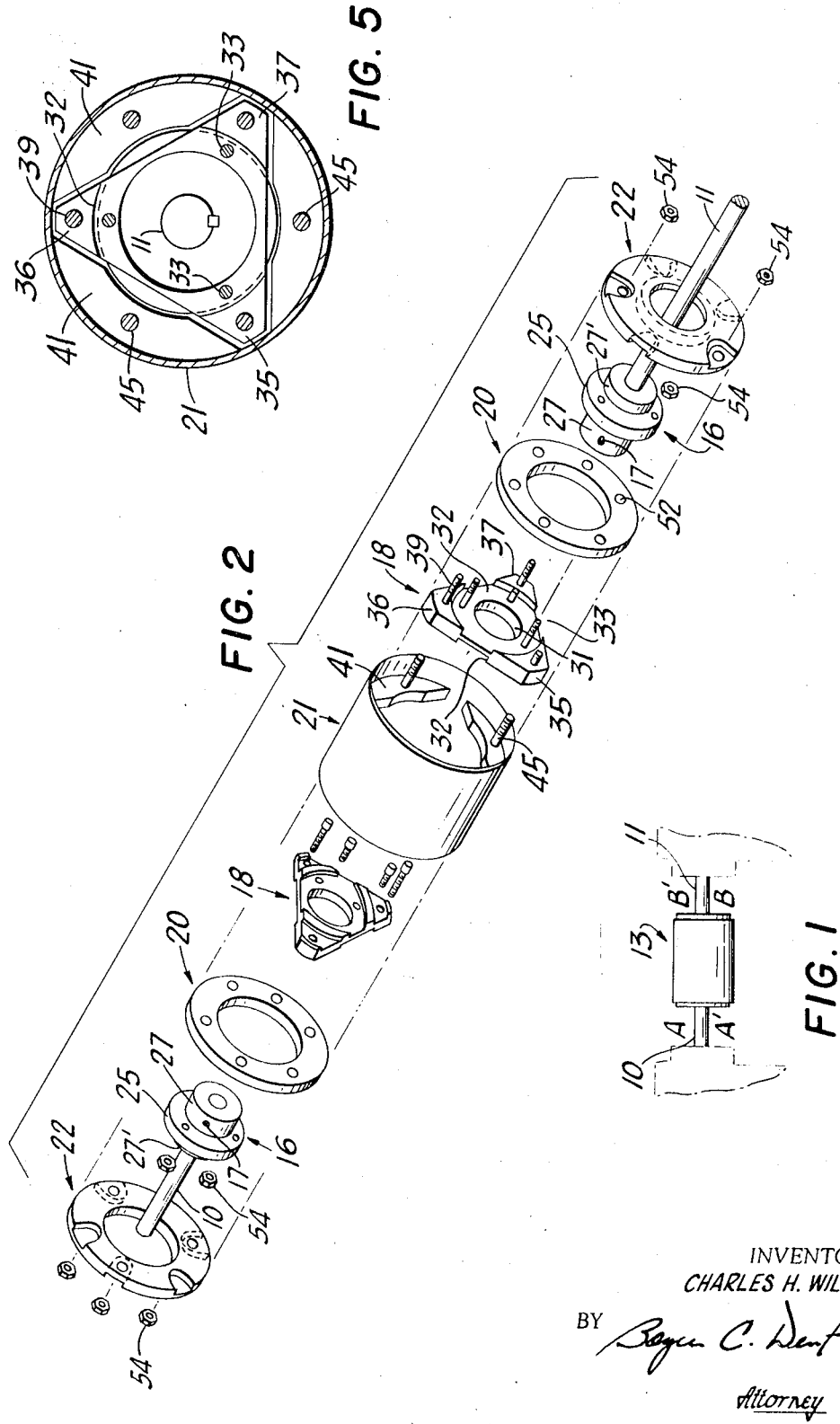

3,654,775

DISC TYPE FLEXIBLE SHAFT COUPLING

BACKGROUND OF THE INVENTION

1. Field of the Invention

This invention relates to flexible disc-like couplings for connecting two generally aligned shafts.

Description of the Prior Art

A slight misalignment in two generally aligned shafts that are to be coupled is quite common. Rarely do the support bearings hold the shafts in perfect alignment at the time the coupling is installed, and still more rarely does any alignment stay perfect. To prevent severe stresses from developing in the shafts and undue loading on the bearings, the shafts are coupled by a coupling which assumes the stresses. A common type of such coupling is a flexible disc coupling wherein a disc-pack, that is, a laminated ring with the laminations being a series of metal plates, is connected at alternate points around the periphery of the ring to the drive shaft and the driven shaft. The flexural stresses are thus assumed by the disc-pack to protect both the shafts and the bearings from injury because of any misalignment.

An early example of such a disc type coupling is shown in Thomas U.S. Pat. No. 1,188,113. Thereafter, this type coupling was improved several times as shown, for example, in Thomas U.S. Pat. No. 1,323,423; Thomas U.S. Pat. No. 2,182,711; and Thomas U.S. Pat. No. 2,435,058. The latter patent generally illustrates the type of disc coupling widely used today.

Generally, the amount of angular and off-set misalignment of the shafts that can be compensated for by such couplings is determined by the axial separation of the disc-packs; the farther apart the discs are, the greater the amount of misalignment that can be tolerated.

One way of providing increased axial separation of the discs is to place them "outboard" of the hubs; "outboard" meaning that the discs are on the opposite side of the hub from the ends of the shafts. Such an arrangement is shown in Thomas U.S. Pat. No. 1,326,993. However, it can be seen that the hubs must be removed from the shafts in order to replace a broken disc which sometimes happens. Depending on the shaft separation, it is sometimes necessary to move the equipment to which the shafts are connected to enable removal of the hubs for replacing the disc-packs.

Another problem associated with conventional disc couplings is that upon failure of the discs, the driving shaft can continue to rotate freely thereby damaging other parts of the coupling or the drive source itself.

In conventional disc-pack couplings the disc-packs are made up of a number of separate laminations mounted serially on the mounting studs. The laminations forming the discs are jig-drilled to assure a firm fit with the connecting studs; nevertheless, individual laminations furnished as replacements are fragile and subject to damage, both in handling and during assembly.

SUMMARY OF THE INVENTION

Accordingly, an object of the present invention is to provide a disc type flexible shaft coupling with more than conventional angular and offset misalignment capability which is readily disassembled without moving the connected shafts, further constructed to provide fail-safe operation if the disc-pack fails and further including a unitary disc-pack. The foregoing is accomplished by providing a hub for connection to each of the axially adjacent shafts with each of the hubs having a generally triangular adapter connected to both the hub and its associated disc-pack. A sleeve axially connects both disc-packs for driving rotation, the sleeve including internal flange segments defining generally triangular openings in which the triangular adapters are nested to provide a fail-safe driving connection in the event of disc-pack failure. Shrouds are utilized to substantially close the ends of the sleeve around the disc-packs. The adapter is separable from the hub, and the inner diameter of the disc-pack is larger than the hub, therefore the disc-packs can be removed from the coupling without disturbing the hubs and shafts. Added versatility is achieved by proportioning the hubs and adapters so that the hubs may be axially reversed on the shafts and the adapters may be mounted either inboard or outboard of the hubs to accommodate various shaft separations. The disc-pack is constructed as a unitary assembly to reduce breakage of individual laminations in handling and assembly and to improve the ease of replacement of disc-packs.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

FIG. 1 illustrates two generally aligned shafts connected by a preferred embodiment of the coupling of this invention;

FIG. 2 is an axially exploded view of the coupling of FIG. 1 illustrating the interrelation of the various elements of the coupling;

FIG. 5 is a cross-sectional view of the coupling taken along line V—V of FIG. 3;

Figure 10:
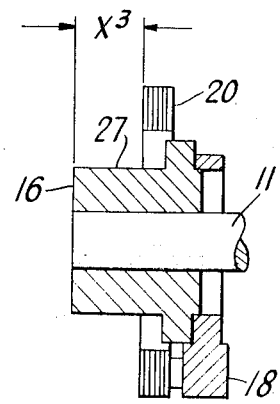
Figure 11:
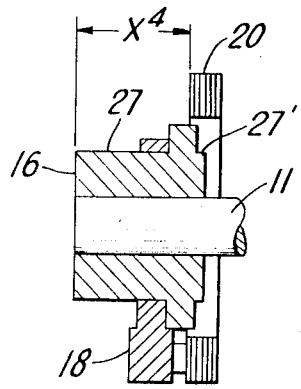
Figure 12:
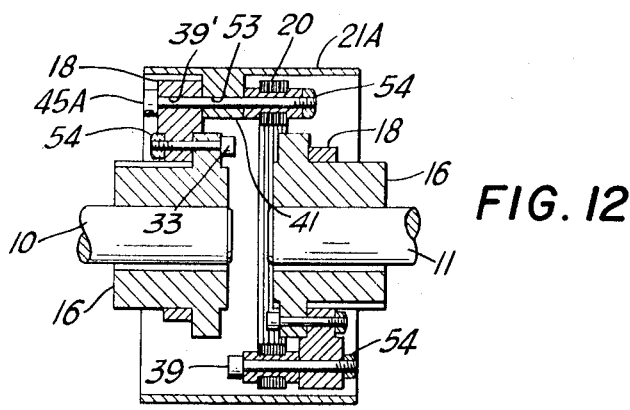

FIGS. 8, 9, 10, and 11 schematically illustrate the many possible hub to shaft mountings to vary and the axial separation of the disc-packs; and FIG. 12 illustrates another embodiment of the invention using a single disc-pack.

Referring now to FIG. 1, the two shafts 10 and 11 are connected by the preferred embodiment of the coupling generally designated 13. The right and left portions of the coupling are substantially alike and are comprised, as shown in FIG. 2, of a hub 16 suitably connected to each shaft 10 and 11, an adapter 18 connected to each hub 16 and laminated disc-packs 20 connecting the adapters to a sleeve 21. A shroud 22 closes each end of sleeve 21 if desired.

Two shafts which are to be connected will rarely be in perfect alignment. If the shafts 10 and 11 were rigidly joined while a misalignment exists, tensile stresses would develop at A and B when the shafts are in the position illustrated and compressive stresses would develop at A' and B' after the shafts have turned half a revolution from the position shown in FIG. 1. As a result of this turning, the metal which is initially at A in tension would now be at A' and be in compression and an analogous reversal of the stress would occur for the metal initially at B. Thus, for each revolution of the shaft, a complete cycle in reverse bending and stress occurs. The novel coupling of this invention absorbs the stress; and strains are removed from the shafts and the bearings, yet the coupling provides a driving arrangement as if the shafts were actually integral.

The hubs 16 are secured for rotation with shafts 10 and 11 in the conventional manner by keys 19 and set-screws 17. Each hub includes a collar portion 25 that has a diameter greater than the diameter of shank portions 27 and 27'.

Figure 3:
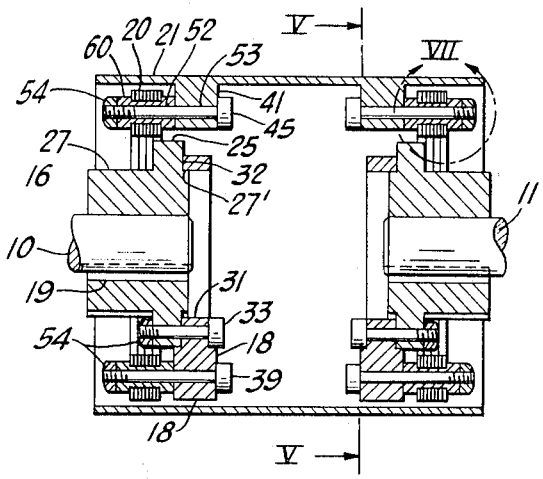
FIG. 3 is a side view of the coupling in cross-section illustrating the manner of mounting the coupling to a pair of axially adjacent shafts.

The inner diameter 31 of adapter 18 fits snugly on either shank portion 27 or 27' of hub 16, and either of relief diameters 32 abuts collar 25 depending on the assembly configuration chosen as best shown in FIG. 3. Conventional socket head screws 33 extend through adapter 18 and collar 25 to secure the adapter 18 and hub 16 together. Adapter 18 is generally triangular and includes apexes 35, 36 and 37 through which the socket head screws 39 pass to secure the adapter 18 to sleeve 21 as will be more fully explained. Nuts 54 threaded on screws 33 and 39 secure the parts tightly together.

The sleeve 21 is generally tubular in shape. Its diameter is made to surround adapters 18, and its length is made to extend from one adapter to the other. Adjacent each end of the sleeve are radially inwardly extending flange portions 41. The openings between flanges 41 define a generally triangular shape that is slightly larger in size than the triangular perimeter of adapter 18 thus providing a slight clearance between adapter 18 and the flanges 41 to nestle adapter 18. At the midpoint of each side of the flange portions 41 are holes 53 for cap screws 45.

Preferably, the apexes 35, 36, and 37 are spaced circumferentially equidistant to improve the balance of the coupling 13.

The disc-pack 20 is a laminated metal ring comprised of a number of metal plates or discs arranged as a unitary assembly as will be more fully discussed hereinafter. Disc-pack 20 has a series of evenly spaced openings 52 for connecting it to adapter 18 and flanges 41.

Cap screws 39 and 45 alternately connect the disc-pack 20 to the adapter 18 and the flanges 41 of sleeve 21. Nuts 54 on screws 39 and 45 secure the assembly tightly together. The heads of the screws are placed within the sleeve 21 and the nuts are placed externally of the sleeve for accessibility. Preferably, holes 53 are made small enough to tightly restrain the screws 45 against sliding which helps in assembling the coupling.

Figure 7:
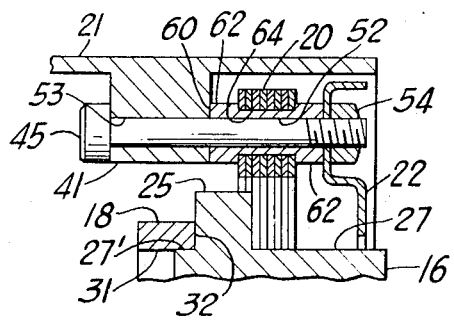
FIG. 7 is an enlarged detail of the portions within circle VII of FIG. 3 illustrating the disc-pack assembly.

Shrouds 22 are secured to the assembly by screws 45 and nuts 54 as best illustrated in FIG. 7. The shrouds are suitably formed so as to close the ends of sleeve 21 and surround either shank portion 27 or 27' of hub 16, depending on the mounting arrangement chosen for the hubs. The shrouds may be formed from sheet metal or fabricated from plastic or other material since their function is to provide substantially smooth ends on the sleeve 21. The shrouds may be omitted if desired.

Figure 4:
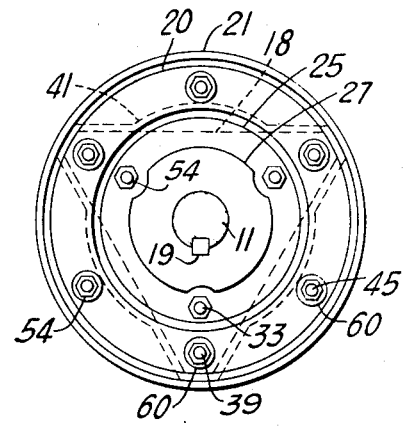
FIG. 4 is an end view of the assembled coupling of FIG. 3.

The end view of coupling 13 is illustrated in FIG. 4 with the shroud 22 removed and shows the preferred arrangement of the mounting screws to provide maximum strength and accessibility.

FIG. 5 illustrates the manner in which adapter 18 is nested within flanges 41 to provide fail-safe operation. For example, if disc-pack 20 fails, as from over loading, or if the screws should shear off, then the apexes 35, 36, and 37 of adapter 18 will bear against the inner periphery of flanges 41 so that the coupling will continue to transmit torque until the driving and driven machines can be stopped. This arrangement also prevents damage to the other coupling parts in case of such failures.

As previously mentioned, coupling 13 is extremely versatile. For example, various shaft separations can be obtained by leaving the distance fixed between the disc-packs 20 and arranging the hub 16 and adapter 18 mountings as shown in FIGS. 8 through 11. Conversely, the shaft separation can remain fixed and the distance between disc-packs 20 can be varied by arranging the hub 16 and adapter 18 mountings as shown in FIGS. 8 through 11. When the latter choice is made, the sleeve 21 must be furnished with the distance between flanges 41 made in accordance with the distance desired between the disc-packs. By increasing the distance between the disc-packs 20, a greater amount of axially off-set misalignment of the shafts can be compensated for because the angle of misalignment decreases as a function of the distance between the disc-packs.

Figure 8:
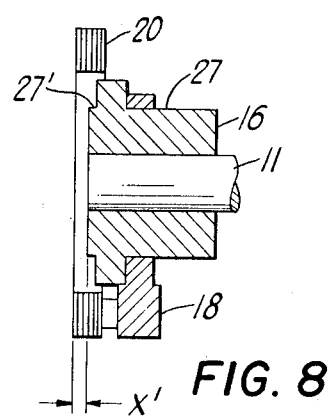

FIGS. 8 through 11 illustrate the various mounting arrangements of the hubs 16 and adapters 18 to vary the dimension X extending from the end of the shaft 11 to the inboard face of disc-pack 20. Thus, in FIGS. 8 and 9, hub 16 is mounted on shaft 11 so that shank 27 extends to the right. In FIG. 8, adapter 18 is mounted around shank 27 with the disc-pack 20 mounted to the left side of the adapter to result in dimension $X^1$.

Figure 9:
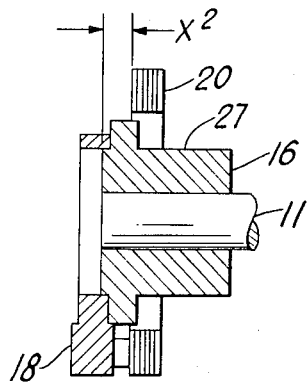

In FIG. 9, the adapter 18 is moved to the left side of hub 16 and around shank 27' with disc-pack 20 mounted to the right side of the adapter to result in dimension $X^2$.

In FIGS. 10 and 11, hub 16 is reversed so that shank 27 extends to the left. In FIG. 10, adapter 18 is mounted on the right side of hub 16 and around shank 27' with the disc-pack 20 mounted on the left side of the adapter to result in dimension $X^3$.

In FIG. 11, the adapter 18 is moved to the left side of hub 16 and around shank 27 with disc-pack 20 mounted on the right side of the adapter to result in dimension $X^4$.

Although not shown in the drawings, it is obvious that the hub 16 on the left side of FIG. 3 can be arranged in any manner illustrated in FIGS. 8 through 11, although not necessarily as a mirror image of hub 16 on the right side of FIG. 3; this permits the distance between the two disc-packs 20 to be varied considerably in small increments. The effect is that various shaft separations can be accommodated with a fixed axial distance between flanges 41 on each end of sleeve 21. If desired, different sleeve lengths can be used to provide a different series of possible shaft separations or to vary the distance between the disc-packs 20.

As previously mentioned, disc-pack 20 is preferably made as a unitary assembly to avoid damage to individual laminations and contribute to the ease of handling the disc-pack. It is possible of course, to use separable laminations by using spacers (not shown) between the disc-pack 20 and flanges 41 and between disc-pack 20 and adapter 18.

In the preferred construction of disc-pack 20, hollow bushings 60 are used to hold the laminations together. Bushings 60 are spaced at six equidistant circumferential locations to correspond to the location of the mounting holes in flanges 41 and adapter 18.

In their initial form, bushings 60 can be tubular rivets inserted in holes 64 in the laminations of the disc-pack. Preferably, bushings 60 are placed on a fixture (not shown) having studs corresponding to screws 39 and 45. The laminations are placed on the bushings; thereafter, bushings 60 can be upset in a convenient manner to provide enlarged portions or heads 62 as best shown in FIG. 7. The disc-pack 20 is thereby made into a unitary assembly. The fixture can be used to simultaneously upset all the bushings at one time.

If desired, bushings 60 can initially be solid with one head 62 preformed; the laminations can then be placed against the head and the opposite head formed by upsetting that end of the bushing. Thereafter, the holes 52 may be drilled in the bushings. Obviously, other variations of this procedure can be successfully applied to achieve the desired result.

By making the disc-pack 20 in this way, all of the holes 52 in the bushings are the same size to fit the screws 39 and 45. All the holes 52 are in predetermined circumferential locations to make the disc-packs interchangeable which contributes to the ease of replacing disc-packs that may have failed.

It should be understood that the number of laminations used to form the disc-pack 20 can be varied to suit the torque to be transmitted by the coupling and to provide the flexibility desired. For example, for light loads, disc-pack 20 may comprise a single lamination having bushings 60 mounted thereto in the manner described. There is no particular limit to the maximum number of lamination used.

FIG. 12 illustrates another embodiment of the invention wherein a single disc-pack 20 is used. This type of coupling is useful where only angular misalignment of the shaft axes must be compensated for without regard to any off-set misalignment of the shaft axes.

The right-hand side of this embodiment is arranged the same way as shown in FIG. 8 with respect to the mounting of hub 16, adapter 18, and disc-pack 20. However, on the left side, the adapter 18 is rotated so that the screw mounting holes 39' are aligned with holes 52 in flanges 41 and with the adapter 18 positioned to the left of flanges 41. Cap screws 45A and nuts 54 are used to draw up the assembly into a rigid joint. Thus, the only flexing that will occur during rotation of the coupling will be in the single disc-pack 20. Of course, sleeve 21A is made with only a single set of flanges 41 as shown.

OPERATION

Figure 6:
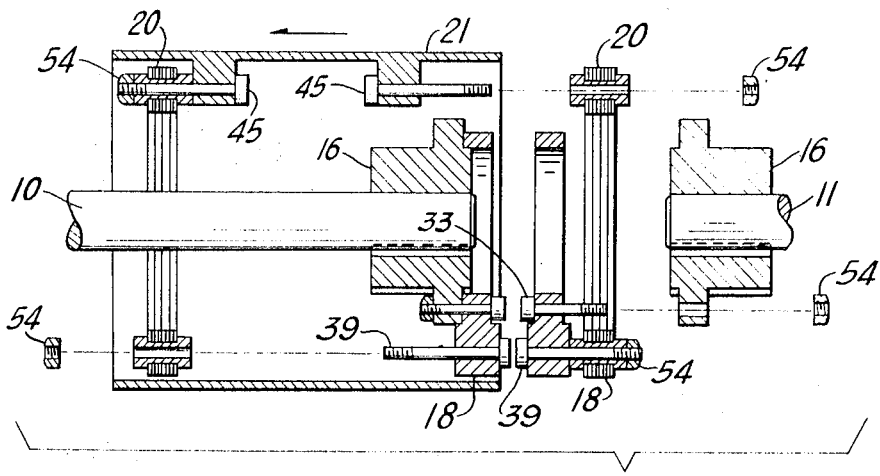
FIG. 6 is a side view of the coupling of FIG. 3 illustrating the manner in which the disc-packs may be removed without disturbing the mounting of the shafts or coupling hubs.

The assembly and operation of coupling 13 have been clearly shown in the drawings and by the foregoing discussion. The manner by which the disc-packs 20 can be replaced may be understood by reference to FIG. 6 as follows.

With the position of shafts 10 and 11 fixed, and assuming that the right-hand disc-pack is to be removed, nuts 54 are removed from screws 45. This permits sleeve 21 to be moved to the left in the direction of the arrow in FIG. 6 to the position shown. Thereafter, removal of nuts 54 from screws 33 permits the assembly comprised of adapter 18 and disc-pack 20 to be moved to the left to a position between the ends of shafts 10 and 11 as shown; this assembly can then be removed from between the shafts. This procedure is effective when the hub 16 is mounted on shaft 11 as shown in FIGS. 9 and 11. The disc-pack 20 can be removed from the adapter 18 by removing nuts 54 from screws 39 without removing the adapter when the hub 16 is mounted on shaft 11 as shown in FIGS. 8 and 10. Either way, a new disc-pack can be mounted to the adapter 18 and then reassembled to the other parts of the coupling as shown in FIG. 3. Removal of the left-hand disc-pack 20 can be accomplished in a similar manner. Thus, it can be seen than replacing the disc-pack is easily accomplished without the need for moving shafts 10 and 11 or hubs 16.

The disc-pack 20 illustrated in FIG. 12 may be removed by first removing nuts 54 from screws 45A and nuts 54 from screws 33. Thereafter, adapter 18 and sleeve 21A may be moved to the left until the area between shafts 10 and 11 is exposed. Nuts 54 are then removed from screws 39 permitting screws 39 to be withdrawn. This, of course, frees disc-pack 20 which may be removed by sliding it from between shafts 10 and 11. The reverse procedure may be used to re-install another disc-pack 20.

Thus, there is provided a totally enclosed coupling for two generally coaxially aligned shafts. A minimum of loose parts are utilized. Should there be any failure of the flexible disc portion, the triangular portion of the adapter will bear against the triangular opening defined by the flanges 41 to continue transmitting torque until the machinery connected by the coupling can be safely stopped; thus the coupling is made fail-safe. Furthermore, the hub mounting arrangements provide a choice of shaft and disc-pack separations which contributes to the versatility of the coupling. An extremely important feature is that the disc-packs can be replaced without having to separate the coupled machinery which is often quite large and difficult to move. The use of unitary disc-packs also contributes to the ease of replacement of the discs and reduces the possibility of damage to them.

It should also be understood that the coupling can utilize disc-packs made from a solid flexible material instead of a series of laminations. For example, usually for light loads, plastic discs may be used. These discs may be made from a wide variety of materials such as polytetrafluoroethylene (PTFE), filled PTFE, fiberglass, polystyrene, and the like.

Although the sleeve 21 has been pictured as shrouding the disc-pack assembly 20, it should be understood that it may terminate at the outer faces of flanges 41 and adjacent the hubs 16. It is desirable to have the sleeve shrouding the disc-packs 20 as shown to provide protection against damage and as a personnel safety feature.

A further advantage of the nesting of the intermediate or adapter members 18 within the triangular opening defined by internal flanges 41 is that overload protection is provided during start-up or rapid deceleration. For example, if high inertial loads must be overcome during start-up of the coupled machinery, the apexes 35, 36, and 37 of intermediate member 18 will bear against flanges 41 to aid the disc-packs 20 in transmitting torque through coupling 13. Conversely, rapid deceleration of the coupled machinery may cause the same result. Accordingly, the clearance between the intermediate member 18 and flanges 41 may be made to provide a controlled amount of relative rotation therebetween, such clearance to be less than an amount that would result in breakage or permanent deformation of the disc-pack 20.

Accordingly, the invention having been described in its best embodiment and mode of operation, that which is desired to be claimed by Letters Patent is:

1. A coupling for connecting a pair of general coaxially aligned shafts, comprising:

a hub member for each of said shafts and mounted for rotation therewith;

a sleeve member extending substantially coaxially with said shafts and between said hub members and having a first end rigidly secured to a first one of said hub members;

a flexible disc member connected to a second end of said sleeve member for rotation therewith; and an intermediate member connected to said flexible disc member and to a second one of said hubs for rotation therewith, whereby one of said shafts is driven by rotation of the other of said shafts through said coupling, said sleeve member being disengageable from said first hub member and from said flexible disc member for axial movement along said shafts to expose an area of separation between said shafts wider than said flexible disc member; and said flexible disc member being disengageable from said intermediate member for axial movement to said area of separation, whereby said flexible disc member is removable from said coupling through said area of separation without axial movement of said hub members and said shafts.

2. A coupling for connecting a pair of generally coaxially aligned shafts, comprising:

a hub member for each of said shafts and mounted for rotation therewith;

a sleeve member extending substantially coaxially with said shafts and between said hub members;

a flexible disc member connected to each end of said sleeve member for rotation therewith; and an intermediate member connected to each of said flexible disc members and to each of said hubs respectively for rotation therewith, whereby one of said shafts is driven by rotation of the other of said shafts through said coupling, said sleeve member being selectively disengageable from one of said intermediate members and from one of said flexible disc members for axial movement along said shafts in either a first or second direction to expose an area of separation between said shafts wider than said flexible disc member; and said flexible disc members being selectively disengageable from said intermediate members for axial movement to said area of separation, whereby a selected one of said flexible disc members is removable from said coupling through said area of separation when said sleeve member is moved in said first direction and the other of said flexible disc members is removable from said coupling through said area of separation when said sleeve member is moved in said second direction, without axial movement of said hub members and said shafts.

3. The coupling of claim 2 wherein:

said sleeve member includes internal flanges adjacent each end thereof defining a substantially triangular opening; and said intermediate members are formed substantially triangular and are adapted to nest within said triangular openings so that upon limited turning of said intermediate members relative to said sleeve, the intermediate members engage said flanges in driving engagement, thereby providing fail-safe operation of said coupling.

4. The coupling of claim 3 wherein:

said disc members include a series of substantially equally spaced openings extending axially therethrough near the outer periphery thereof; and fastening means extending through said openings for fastening said disc members alternately to said internal flanges and to said intermediate members.

5. The coupling of claim 4 wherein:
said disc members are positioned outboard of said flanges and surround said hubs; and
a selected one of said intermediate members and said disc members are movable to said area of separation upon removal of said fastening means to permit removal of said disc members from said coupling.

6. The coupling of claim 4 wherein:
said hubs include a collar portion and first and second shank portions extending axially from opposite sides of said collar; and
said intermediate members are adapted for mounting on either of said shank portions to provide a preselectable axial separation for said intermediate members.

7. The coupling of claim 6 wherein:
said disc members are adapted for mounting on either side of said intermediate members to provide a preselectable axial separation for said disc members.

8. The coupling of claim 3 wherein the axial length of said sleeve terminates at the outer axial faces of said internal flanges.

9. The coupling of claim 5 wherein the axial length of said sleeve extends beyond the outer axial faces of said internal flanges a sufficient distance to surround said disc members and said fastening means.

10. The coupling of claim 9 further including shroud members secured adjacent said disc members for substantially closing the ends of said sleeve between the ends thereof and said shafts.

11. The coupling of claim 5 wherein said flexible disc members comprise a plurality of coaxially joined laminations.

12. The coupling of claim 11 wherein said laminations are made from metal.

13. The coupling of claim 5 wherein said flexible disc member is non-metallic.

14. A coupling for connecting a pair of general coaxially aligned shafts, comprising:
a hub member for each of said shafts and mounted for rotation therewith;
a sleeve member extending substantially coaxially with said shafts and between said hub members and having a first end rigidly secured to a first one of said hub members;
a flexible disc member connected to a second end of said sleeve member for rotation therewith; and
an intermediate member connected to said flexible disc member and to a second one of said hubs for rotation therewith,
whereby one of said shafts is driven by rotation of the other of said shafts through said coupling,
said flexible disc member comprising a unitary assembly of a plurality of metallic laminations having a series of substantially equally spaced openings extending axially therethrough near the outer periphery thereof and further including fastening means extending through each of said openings for securely joining said laminations to form a unitary assembly thereof.

15. A unitary flexible disc member for a flexible disc type coupling, comprising:
a plurality of metallic lamina discs having side faces secured in direct abutting contact for forming a laminar flexible disc member, said member having a series of substantially equally spaced openings extending axially therethrough near the outer periphery thereof; and
fastening means extending through said openings for joining said lamina discs in a unitary assembly.

16. The disc member of claim 15 wherein said fastening means comprises a tubular bushing extending through said openings,
said bushing including head portions, of larger diameter than said openings, abutting the outermost lamina of said disc member for retaining said lamina tightly together.

* * * * *